United States Patent
Padovani

(10) Patent No.: US 6,769,856 B2
(45) Date of Patent: Aug. 3, 2004

(54) PLANT FOR UNLOADING STACKS OF THERMOFORMED OBJECTS FROM A RECEIVING CAGE TO A REMOVING CONVEYER

(75) Inventor: Pietro Padovani, Verona (IT)

(73) Assignee: Isap OMV Group SpA, Parona (IT)

( * ) Notice: Subject to any disclaimer, the term of this patent is extended or adjusted under 35 U.S.C. 154(b) by 135 days.

(21) Appl. No.: 10/076,940

(22) Filed: Feb. 14, 2002

(65) Prior Publication Data

US 2002/0110441 A1 Aug. 15, 2002

(30) Foreign Application Priority Data

Feb. 15, 2001 (IT) .................................... VR2001A0018

(51) Int. Cl.⁷ .............................................. B65G 65/23
(52) U.S. Cl. .................. 414/416.09; 414/418; 414/420; 198/861.5
(58) Field of Search ...................... 414/416.04, 416.09, 414/403, 418, 419, 420, 790.3; 198/861.1, 861.5, 867.11, 867.12, 418.6

(56) References Cited

U.S. PATENT DOCUMENTS

| | | | |
|---|---|---|---|
| 3,491,633 A | | 1/1970 | White |
| 3,616,951 A | * | 11/1971 | St. Clari et al. ......... 414/416.09 |
| 3,619,443 A | | 11/1971 | Feldman ...................... 264/89 |
| 3,773,457 A | | 11/1973 | Badoux et al. ............. 425/388 |
| 3,820,496 A | * | 6/1974 | Sheetz ........................ 414/420 |
| 4,609,339 A | | 9/1986 | Padovani .................... 425/383 |
| 4,776,742 A | * | 10/1988 | Felder ...................... 414/796.7 |
| 4,911,602 A | * | 3/1990 | Abe ............................ 414/421 |
| 5,244,330 A | * | 9/1993 | Tonjes ................... 414/331.01 |
| 5,591,463 A | | 1/1997 | Padovani .................... 425/359 |
| 6,227,357 B1 | * | 5/2001 | Brown, Sr. .............. 198/861.4 |

FOREIGN PATENT DOCUMENTS

| | | |
|---|---|---|
| DE | 1 432 263 | 11/1968 |
| DE | 1 958 637 | 1/1971 |
| DE | 42 24 009 | 8/1993 |
| DE | 198 12 414 | 9/1999 |
| EP | 0 810 079 | 12/1997 |
| EP | 0 995 582 | 4/2000 |
| EP | 1 075 924 | 2/2001 |

* cited by examiner

Primary Examiner—Dean J. Kramer
(74) Attorney, Agent, or Firm—Ladas & Parry

(57) ABSTRACT

A plant for unloading stacks (5) of thermoformed products from a cage (4) containing stacks (5), which comprises a support structure (2), at least one support plate (3) for a respective cage (4) containing stacks (5), which is mounted for rotation on the support structure (2), reversible motor (8) to cause the support platen (3) to effect angular movements of a preset amplitude around a horizontal axis, so as to angularly move its respective containing cage (4) between an erect position, in which the stacks (5) of thermoformed products contained therein extend in a substantially vertical direction, and an inclined unloading position, expeller bar (12) designed to expel stacks (5) of thermoformed objects from the cage (4) when the support plate (3) is in inclined unloading position, and a conveyer (20) for receiving stacks (4) of thermoformed objects unloaded from the containing cage (4) located downstream of the unloading position of the support plate (3).

14 Claims, 2 Drawing Sheets

US 6,769,856 B2

PLANT FOR UNLOADING STACKS OF THERMOFORMED OBJECTS FROM A RECEIVING CAGE TO A REMOVING CONVEYER

BACKGROUND OF THE INVENTION

The present invention regards a plant for unloading stacks of thermoformed products from a stack receiving cage onto a removing conveyer.

With the expression "thermoformed objects" in this description and in the claims, it is meant hollow packaging products, typically, lids and containers, e.g. drinking cups, coffee cups, dessert cups, tubs, plates, trays and the like.

Unloading and handling in general of a plurality of stacks of thermoformed objects is often problematical as the passage from one transfer support to another needs constant surveillance to ensure the perfect axial alignment of the stacks and it is necessary that the various products forming each stack are kept compact to avoid the disintegration of the stacks, which may occur for example with shallow containers, such as lids and plates, which can be a source of problems and difficulties in successive handling operations, e.g. during the de-stacking of these products, for example in an automatic de-stacking machine.

SUMMARY OF THE INVENTION

The main object of the present invention is to provide a plant for unloading or discharging a plurality of parallel stacks of thermoformed products from a containing crate or cage to another support, which makes it possible to change the orientation direction of the stacks, whilst keeping these compact and in perfect axial arrangement.

Another object of the present invention is that the said unloading plant or system permits the graduated and sequential discharge of a pre-established number of stacks at a time until all the stacks in a containing cage have been discharged.

Yet another object of the present invention is that the said discharge plant is of a high efficiency and can operate in step and in synchronisation with a thermoformed products stacking line downstream of a single station thermoforming machine or press with form and cut mould.

These and other objects, which will be better appear below, are attained by a plant for unloading stacks of thermoformed products starting from a stack containing case, which includes a support structure, at least one supporting plate for a respective stack containing cage, that is mounted for rotation on said support structure, drive means arranged to cause the said support plate to effect angular excursions of predetermined amplitude around a horizontal axis, thereby angularly moving a respective stack containing cage between an erect position, in which the stacks of thermoformed objects contained therein extend in a substantially vertical direction, and an inclined discharge position, expeller means for expelling stacks of thermoformed products from said support plate when said support plate is in an inclined discharge position, a receiving conveyer for the stacks of thermoformed products unloaded from said containing cage located downstream of the discharging position of said support plate, and drive means arranged to vertically move the said support plate between a plurality of unloading positions to unload stacks of thermoformed objects at different levels onto said receiving conveyer.

Advantageously, the plant includes drive means to vertically move said support plate between a plurality of discharge positions to unload groups of stacks of thermoformed objects onto said receiving conveyer at different levels. Moreover, said receiving conveyer is inclinable substantially at the same angle of inclination as said support plate in its inclined discharge position.

BRIEF DESCRIPTION OF THE DRAWINGS

Further aspects and advantages of the present invention will better appear in the following detailed description of some currently preferred embodiments, given as illustrative and not limiting examples with reference to accompanying drawings, in which.

DESCRIPTION OF THE PREFERRED EMBODIMENTS

Figures 1, 2, 3:
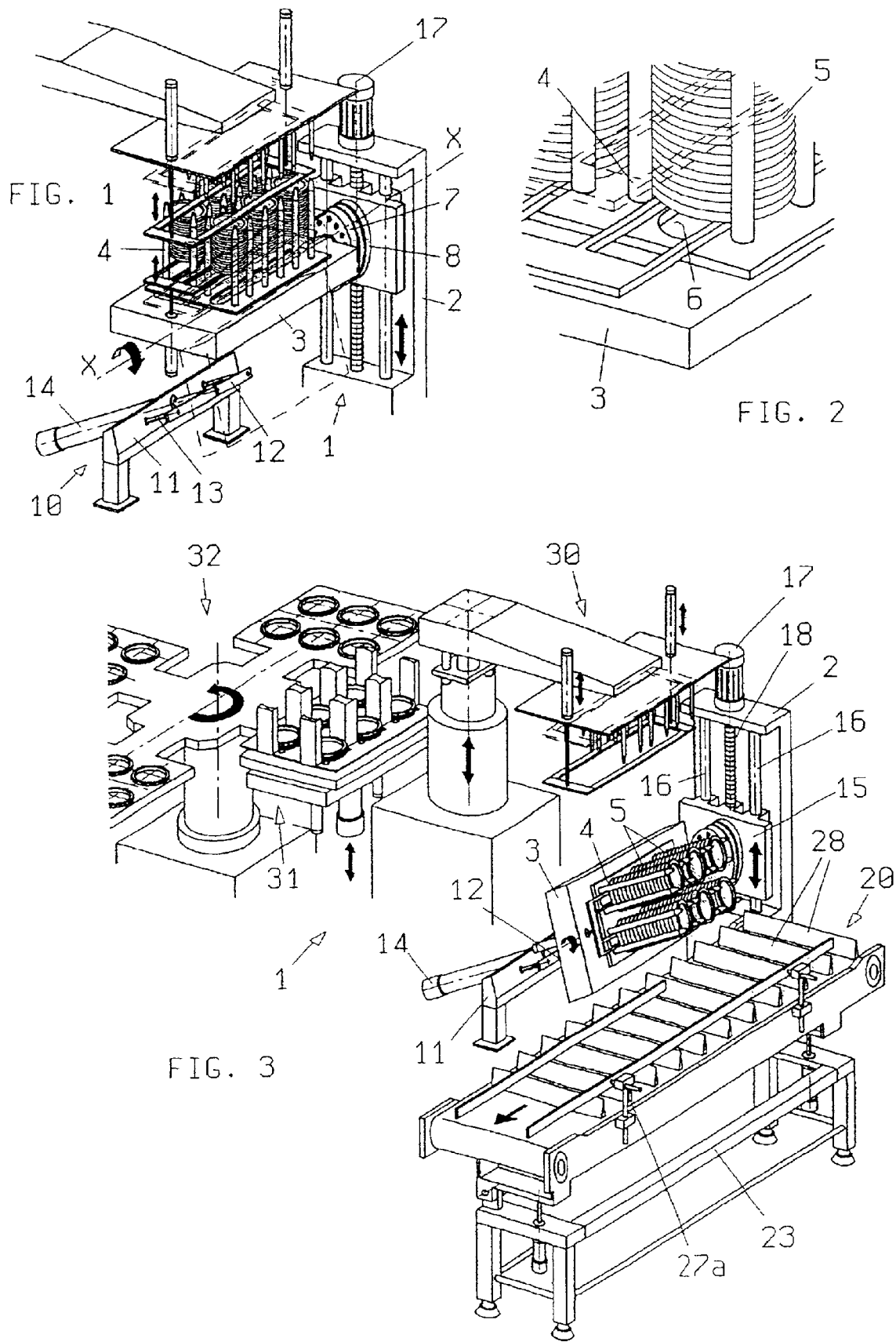
FIG. 1 is a front view of a plant according to the present invention, without (for illustrative purposes) a taking away conveyer.
FIG. 2 shows a detail on an enlarged scale of a support plate of a receiving crate for stacks of thermoformed objects.
FIG. 3 shows a complete plant according to the present invention with a taking away conveyer arranged in horizontal attitude.

With reference to the above Figures, it will be noted that as a discharge or unloading plant or system, generically indicated with 1, according to the present invention, is made up of a support structure or upright 2, which bears overhead a support plate (3) for a receiving cage 4 of stacks 5 of thermoformed objects or products. The support plate 3 is formed with a plurality of through openings or slots 6 (FIG. 2) at each stack or row of stacks 5 and is mounted for rotation around a horizontal axis x—x on the upright 2 through a support head 7 rotatable about the axis x—x- and provided with a reversible electric drive motor 8 which carries out angular programmed movements of preset width. The support plate 3 and the cage 4 brought by it are therefore angularly movable between an erect position, in which the cage 4 can be loaded in any suitable way with a multiplicity of stacks 5 of vertical thermoformed products, and an inclined discharge position.

Beneath the support plate 3 there is provided a product expeller device, e.g. comprising a support stand 11, and a transverse expulsion bar 12 at the head of a plurality of rods 13 driven at the other side thereof by a double-acting pneumatic jack 14 and slidably supported on the stand 11. The bar 12 is arranged to pass through the slot 6 or slots 6 in the support plate 3, once the latter has been brought into its inclined unloading position, to expel a complete row of stacks 5 of thermoformed products from the cage 4 and discharge them onto a taking away conveyer 20.

Should the cage have several rows of stacks 5, the turning head 7 is mounted on a slide 15 slidably mounted on vertical guides 16 and driven to move up and down, upon control, by a reversible electric motor 17 which drives a control screw 18 meshing with a nut screw integral with, or secured to, the slide 15. With this structure, once a row of stacks 5 has been expelled from the cage or crate 4, the plate 3 is lowered to such an extent as to bring the adjacent row and successively, the remaining rows of stacks to the level of the taking away conveyer 20.

Figure 5:
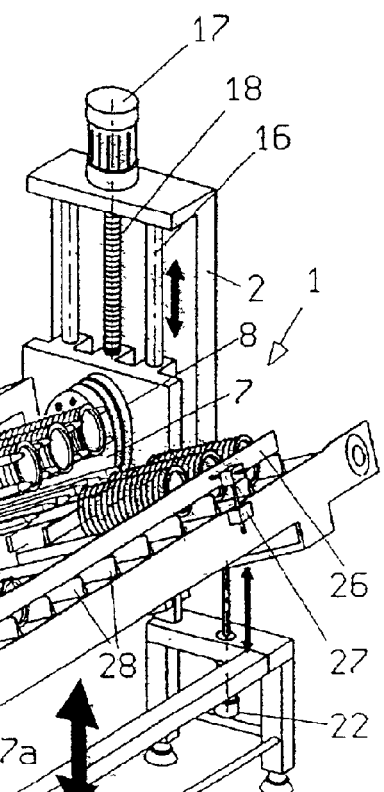
FIG. 5 shows a plant according to the present invention with taking away conveyer in inclined attitude and while receiving stacks of thermoformed objects.
Figure 6:
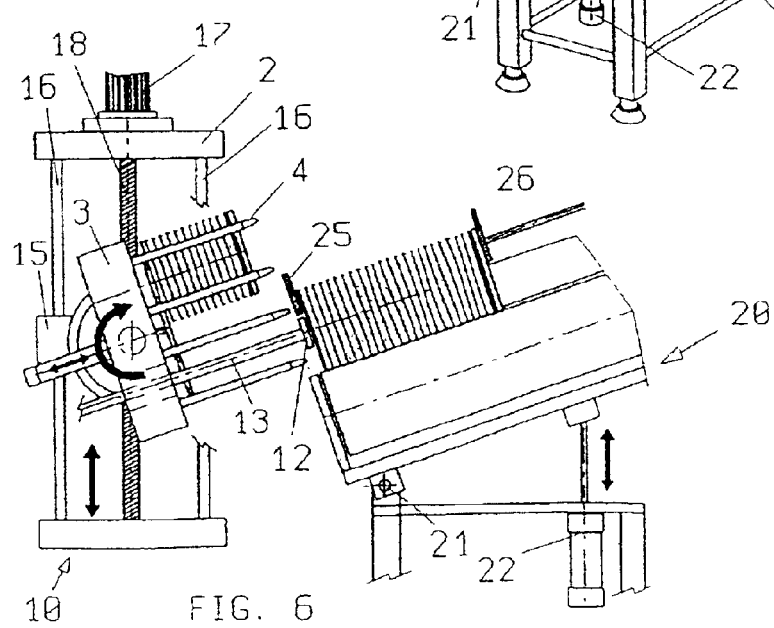
FIG. 6 is a frontal diagrammatic view of the system of FIG. 5.

The receiving and taking away conveyer 20 for the stacks 5 of thermoformed products unloaded by the expulsion bar 12 from the containing crate 4 is of the belt type and is located downstream of the unloading position of the support plate 3 and, preferably, as better illustrated in FIGS. 5 and 6, it can be inclined at an angle of less than 90°, e.g. owing to the action of a couple of pneumatic jacks 22, around an articulated horizontal axis, along which there are provided linking pins 21 for articulation to an underlying support frame 23. Preferably, the inclination of the belt conveyer 20 is equal to that of the supporting plate 3 when in its discharging position.

Once complete unloading of the cage 4 has taken place, the conveyer 20, preferably, takes again its horizontal attitude owing to the action of the jacks in order to be aligned with the standard position, for example of a packaging line of stacks 5.

Figure 4:
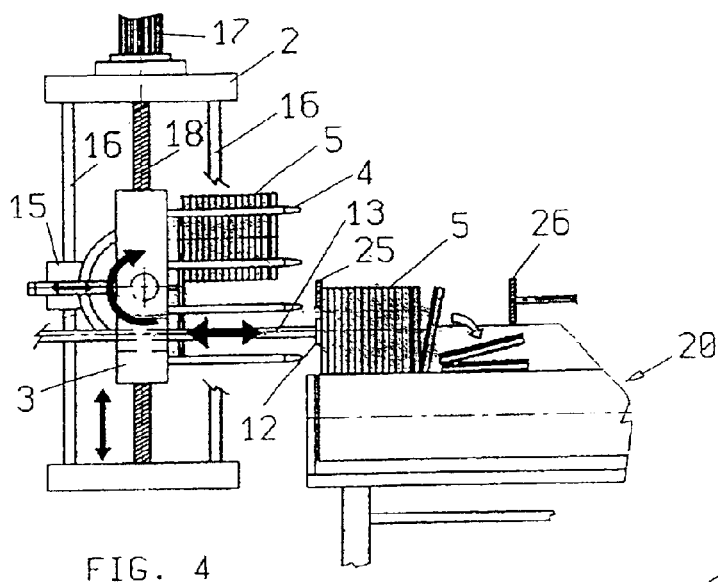
FIG. 4 shows a diagrammatic and partial front view of a handling plant according to the present invention, with expeller means acting horizontally.

In FIG. 4, there is illustrated a taking away conveyer 20 in its horizontal attitude, which is fed with stacks 5 of thermoformed products by an expulsion bar 12 driven by rods 13 also moving in a horizontal direction.

Above and parallel to the direction of movement of the conveyer 20 there are two moving guides: one 25 at the side of the conveyer close to the plate 3 and the other 26 on the opposite side, which extends for the whole length of the conveyer, while the guide 25 terminates at the cage 4 so as not to hinder the passage of the stacks 5 as they are expelled from the cage 4. The guides 25 and 26 prevent the decomposition of the stacks 5, as shown in FIG. 4, when they are loaded on the conveyer 20. During the unloading phase, at the missing section of the guide 25, the expulsion bar 12 acts as a sliding guide, and remains in a co-planar position with the guide 25 until the tape of conveyer 20 is not sufficiently advanced so that all the stacks slidingly abut against the bar 20.

Advantageously, the guide 26 can be adjustably positioned with respect to the guide 25, e.g. by means of overhanging supports 27 and locking clamps 27a. Moreover, the conveyer belt can have transverse partitions 28, which extend parallel to and uniformly spaced from 28 to delimit receiving cradles for the stacks 5, thereby keeping them in constant axial alignment.

As can be seen in FIG. 3, the cage 4 is loaded with stacks 5 of thermoformed products by a transfer device 30, e.g. of the rotating arm type, which can raise-lower to pick up and unload (total or partial) stacks 5 of thermoformed products from a stacking station 31 located at a rotating conveyer 32, for example with four radial template-carrying arms for transporting and stacking thermoformed products.

The disclosure in Italian patent application no. VR2001A000018 filed on Feb. 15, 2001 from which priority is claimed is incorporated herein by reference.

Any reference sign following technical features in any claim has been provided to increase intelligibility of the claim and shall not be construed as limiting the scope of the claim.

What is claimed is:

1. A plant for unloading stacks of thermoformed products from a cage containing product stacks, which comprises a support structure, at least one support plate for a respective cage containing product stacks, which is mounted for rotation on said support structure, drive means to cause said support platen to effect angular movements of a preset amplitude around a horizontal axis, so as to angularly move its respective containing cage between an erect position, in which said stacks of thermoformed products contained therein extend in a substantially vertical direction, and an inclined unloading position, expeller means designed to expel product stacks of thermoformed objects from said cage when said support plate is in inclined unloading position, a conveyer for receiving stacks of thermoformed objects unloaded from said containing cage located downstream of the unloading position of said support plate, and drive means arranged to move the said support plate vertically between a plurality of unloading positions to unload stacks of thermoformed objects at different levels onto said conveyer.

2. A plant according to claim 1, wherein said receiving conveyer is hinged about a horizontal axis and has actuating means to arrange itself into inclined position substantially at the same angle of inclination as the said support plate in its inclined unloading position.

3. A plant according to claim 1, wherein said receiving conveyer has transverse and parallel partitions for the stacks.

4. A plant according to claim 3, wherein said receiving conveyer takes, when loaded with stacks of thermoformed objects, an attitude in accordance with a handling system placed downstream of said conveyer.

5. A plant according to claim 1, comprising in combination a device for transferring stacks or portions of stacks, positioned upstream of said support plate, a stacking station of thermoformed objects designed to feed the said transfer device, and a rotating conveyer with several template-carrying radial arms for mouldings of thermoformed objects.

6. A plant for unloading stacks of thermoformed products from a cage containing product stacks, which comprises a support structure, at least one support plate for a respective cage containing product stacks, which is mounted for rotation on said support structure, drive means to cause said support plate to effect angular movements of a present amplitude around a horizontal axis, so as to angularly move its respective containing cage between an erect position, in which said stacks of thermoformed products contained therein extend in a substantially vertical direction, and an inclined unloading position, expeller means designed to excel product stacks of thermoformed objects from said cage when said support plate is in inclined unloading position, a conveyer for receiving stacks of thermoformed objects unloaded from said containing cage located downstream of the unloading position of said support plate, and a couple of moving guides extending above and parallel to the direction of movement of said conveyer and spaced from one another by a distance substantially equal in length to the height of said stacks (4) to be transported, wherein one moving guide next to the said support plate is shorter than the other moving guide by a given length at the said support plate.

7. A plant according to claim 6, wherein said pair of guides is spaced by an adjustable distance from each other.

8. An apparatus for unloading stacks of thermoformed products from a cage containing product stacks, said cage including: a support structure, at least one support plate for a respective cage containing product stacks, which is mounted for rotation on said support structure, a first drive apparatus to cause said support plate to effect angular movements of a preset amplitude around a horizontal axis, so as to move its respective containing cage angularly between an erect position, in which said stacks of thermoformed products contained therein extend in a substantially vertical direction, and an inclined unloading position, expeller apparatus for expelling product stacks of thermoformed objects from said cage when said support plate is in an inclined unloading position, a conveyer for receiving stacks of thermoformed objects unloaded from said containing cage located downstream of the unloading position of said support plate, and a second drive apparatus arranged to move the said support plate vertically between a plurality of unloading positions to unload stacks of thermoformed objects at different levels onto said conveyer.

9. An apparatus according to claim 8, wherein said conveyer is hinged about a horizontal axis and has actuating means to arrange itself into inclined position substantially at the same angle of inclination as the said support plate in its inclined unloading position.

10. An apparatus according to claim 8, comprising a couple of moving guides extending above and parallel to the direction of movement of said receiving conveyer and spaced from one another by a distance substantially equal in length to the height of said stacks to be transported, wherein one moving guide next to the said support plate is shorter than the other moving guide by a given length at the said support plate.

11. An apparatus according to claim 10, wherein said pair of guides is spaced by an adjustable distance from each other.

12. An apparatus according to claim 8, wherein said conveyer has transverse and parallel partitions for the stacks.

13. An apparatus according to claim 12, wherein said conveyer takes, when loaded with stacks of thermoformed objects, an attitude compatible with a handling system placed downstream of said conveyer.

14. An apparatus according to claim 8, further comprising, in combination, a device for transferring stacks or portions of stacks, positioned upstream of said support plate, a stacking station of thermoformed objects designed to feed the said transfer device, and a rotating conveyer with several template-carrying radial arms for mouldings of thermoformed objects.

* * * * *